April 15, 1958     R. E. J. NORDQUIST     2,830,814
APPARATUS FOR FEEDING AND GAUGING ASKEW SHEETS
Filed Dec. 23, 1954                       7 Sheets-Sheet 1
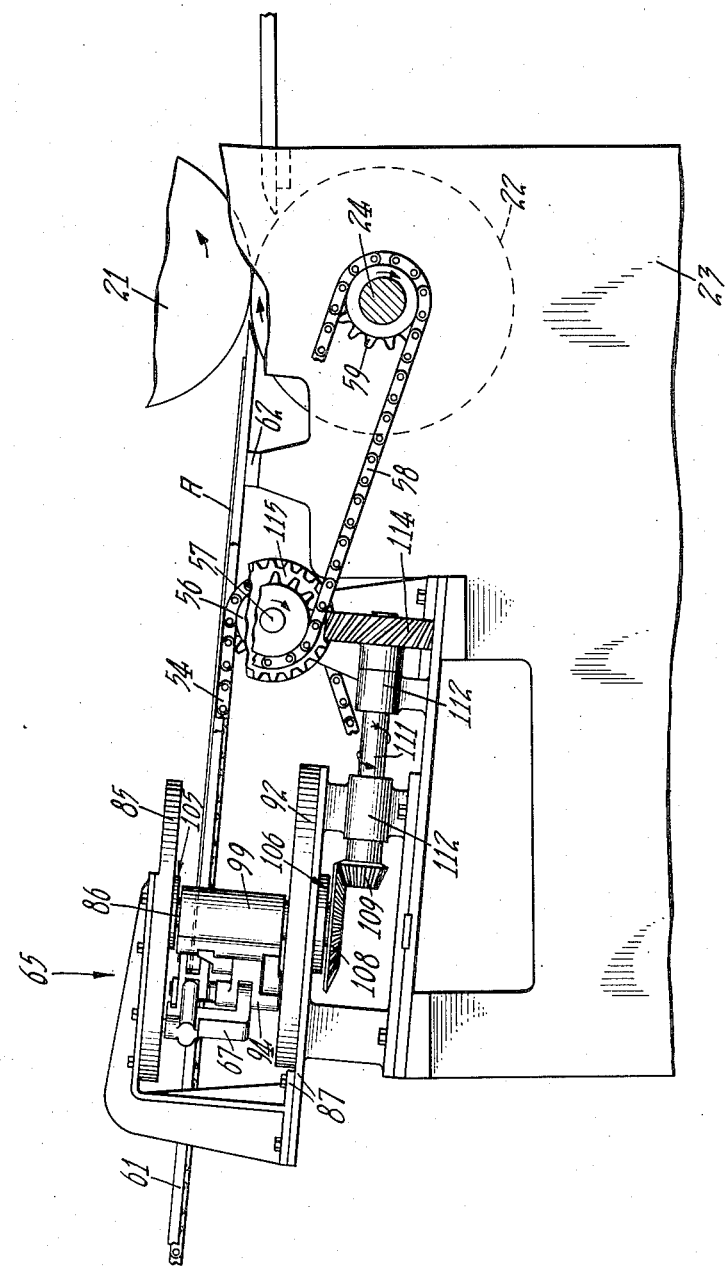
INVENTOR.
RONALD E. J. NORDQUIST
BY
ATTORNEYS

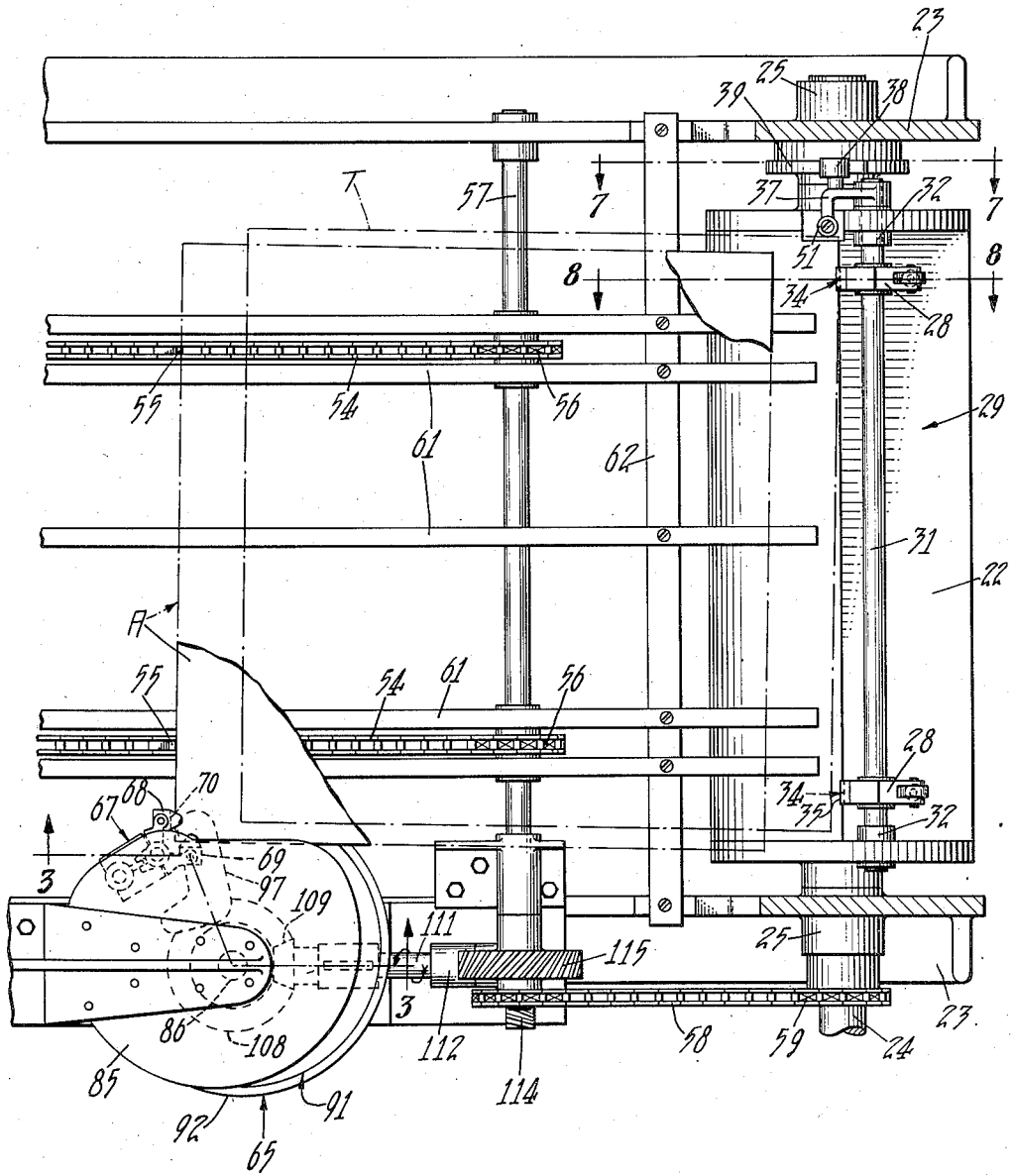

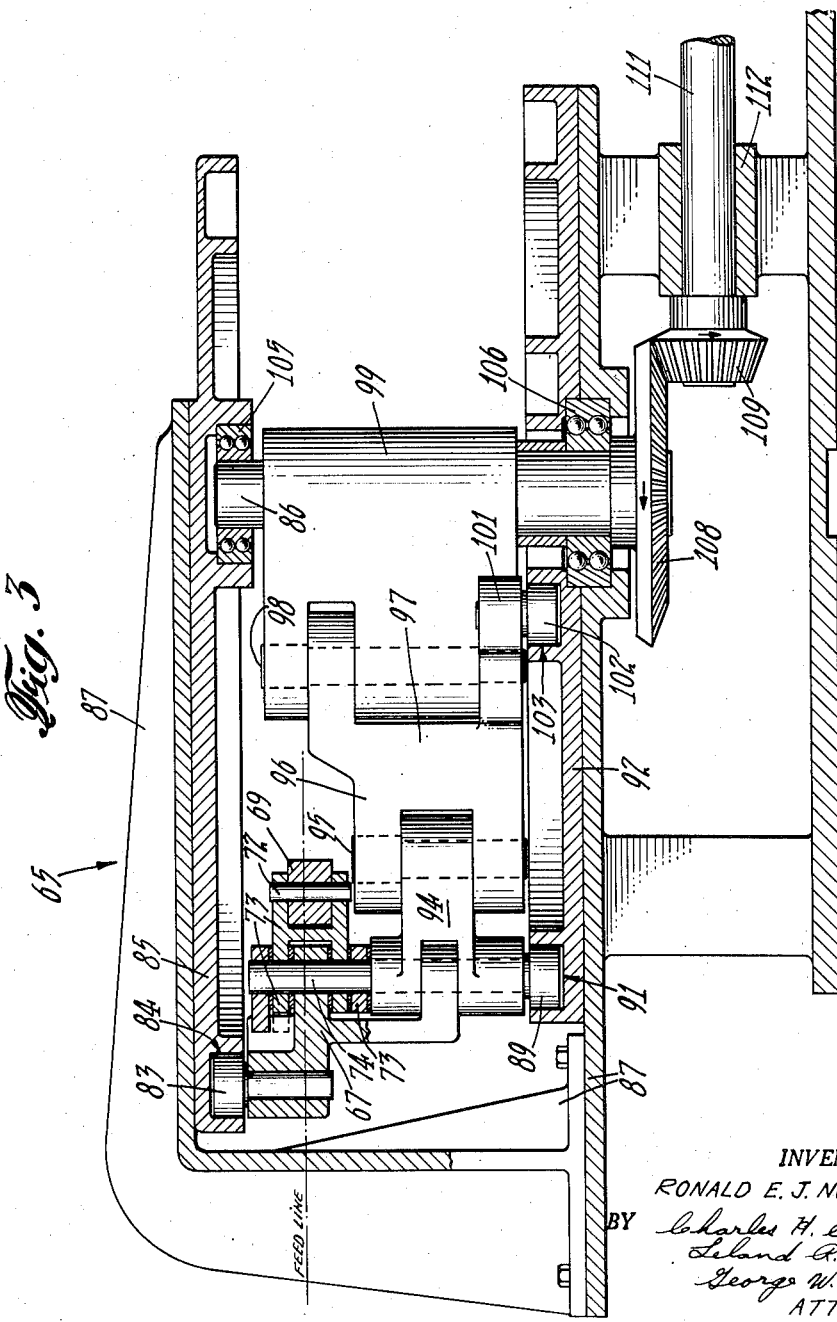

April 15, 1958 R. E. J. NORDQUIST 2,830,814
APPARATUS FOR FEEDING AND GAUGING ASKEW SHEETS
Filed Dec. 23, 1954 7 Sheets-Sheet 4
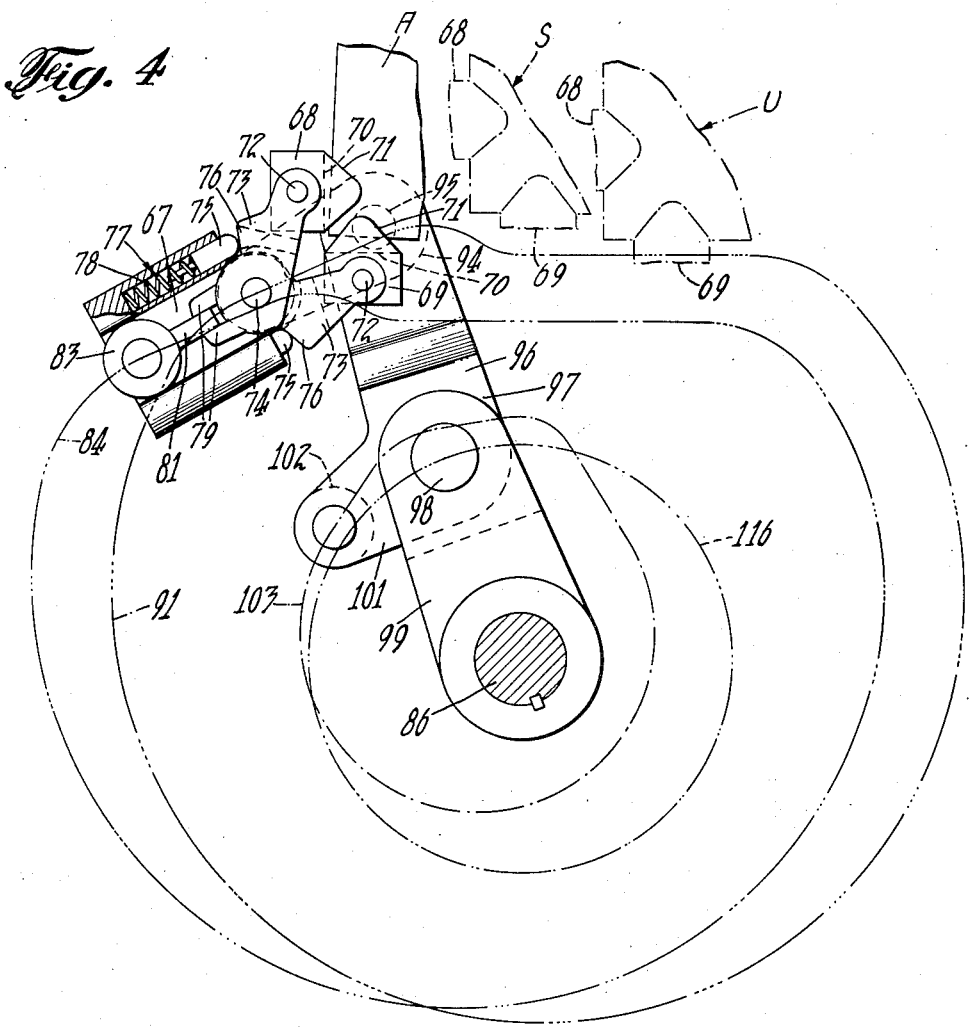
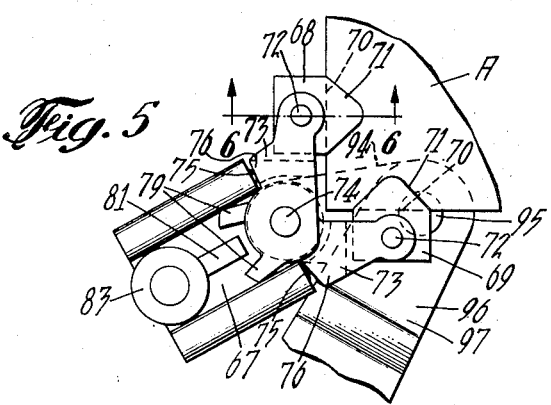
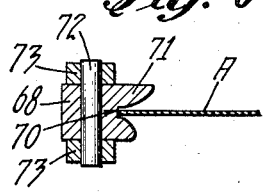
INVENTOR.
RONALD E. J. NORDQUIST
BY
ATTORNEYS April 15, 1958   R. E. J. NORDQUIST   2,830,814
APPARATUS FOR FEEDING AND GAUGING ASKEW SHEETS
Filed Dec. 23, 1954   7 Sheets-Sheet 5
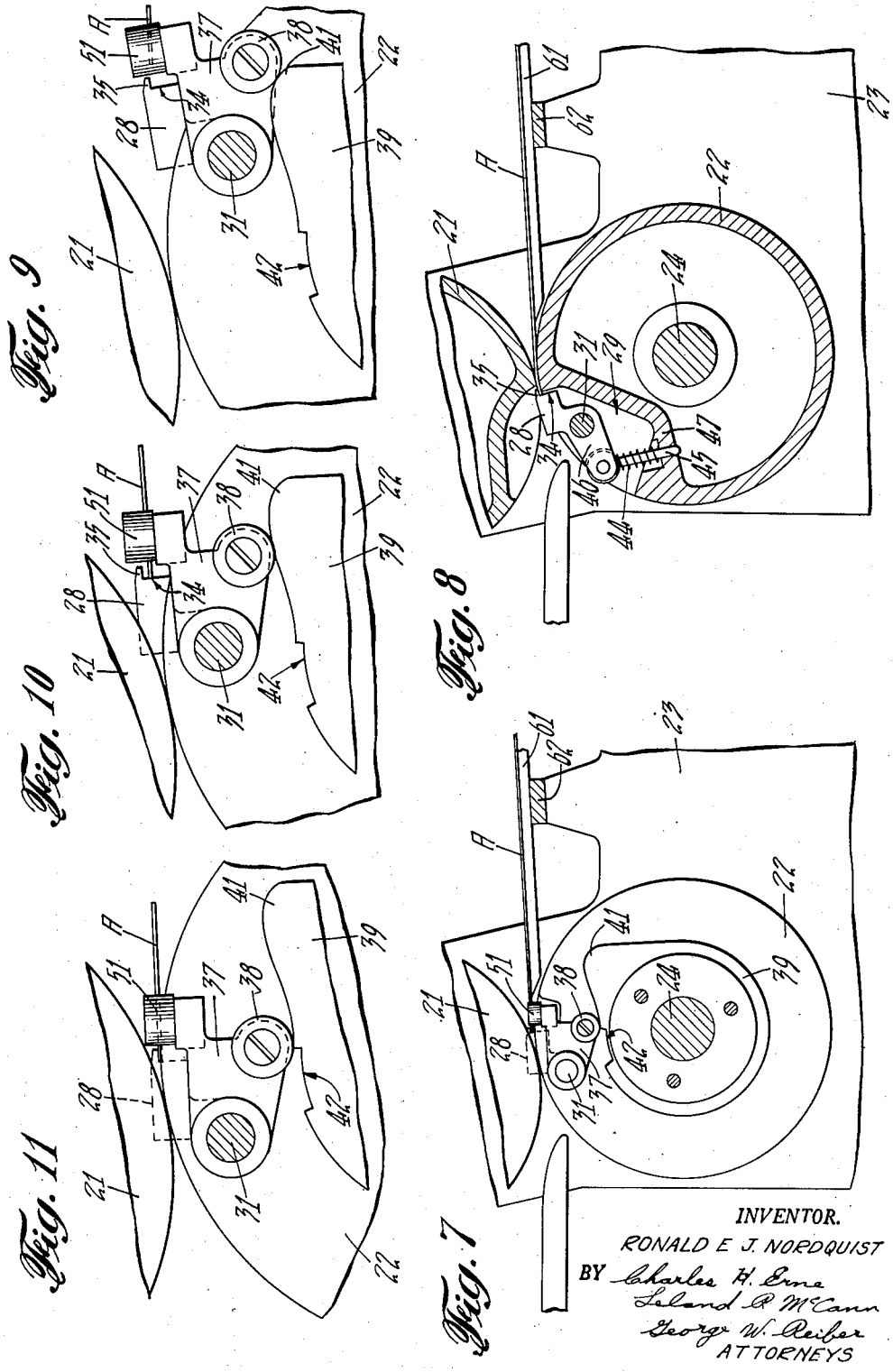
INVENTOR.
RONALD E. J. NORDQUIST
BY Charles H. Erne
Leland R. McCann
George W. Reiber
ATTORNEYS

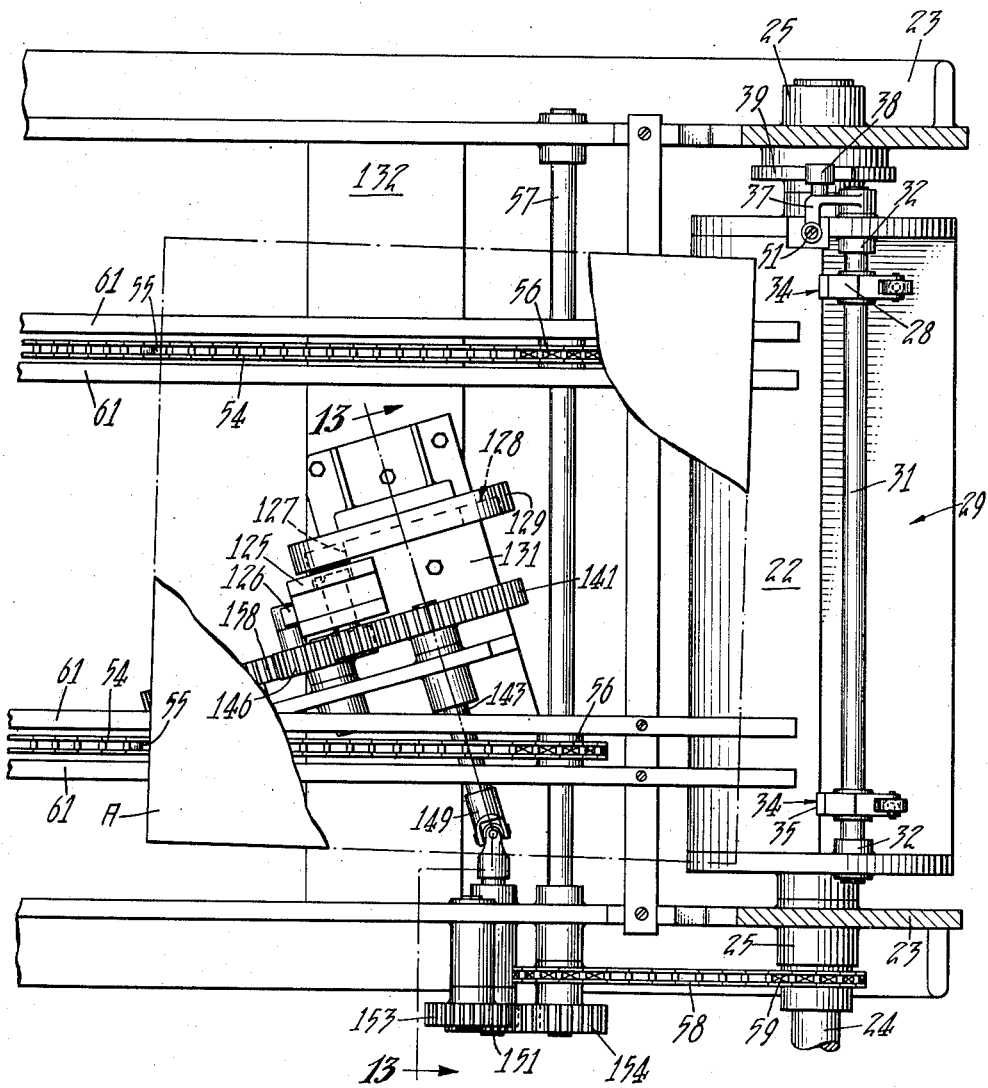

April 15, 1958 R. E. J. NORDQUIST 2,830,814
APPARATUS FOR FEEDING AND GAUGING ASKEW SHEETS
Filed Dec. 23, 1954 7 Sheets-Sheet 7
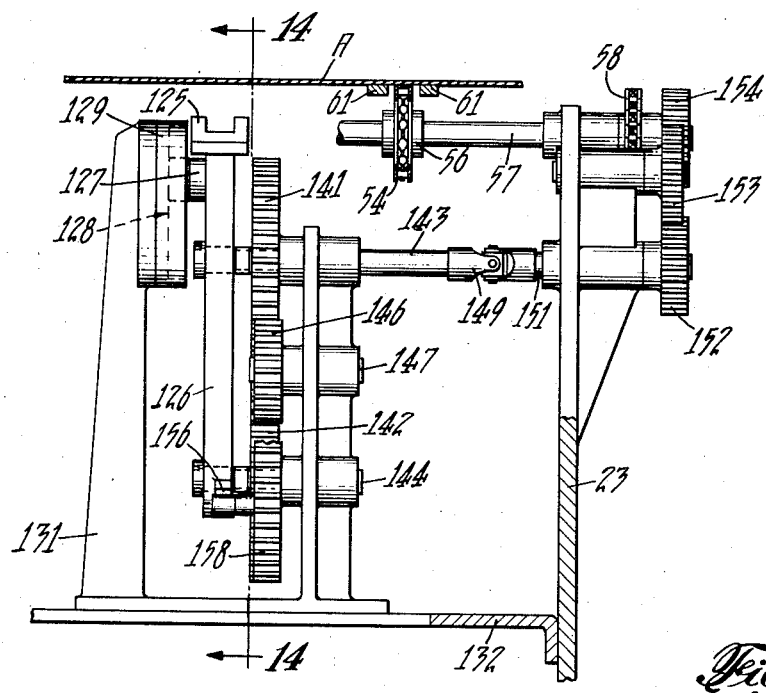
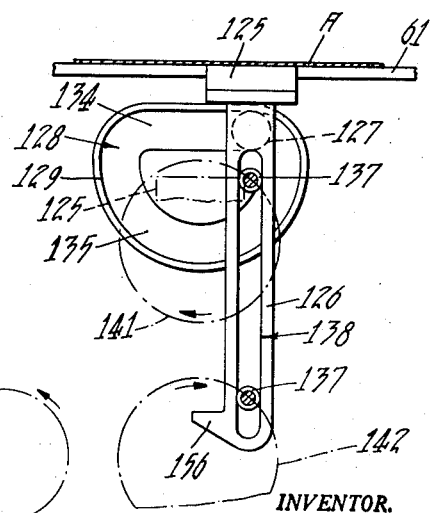
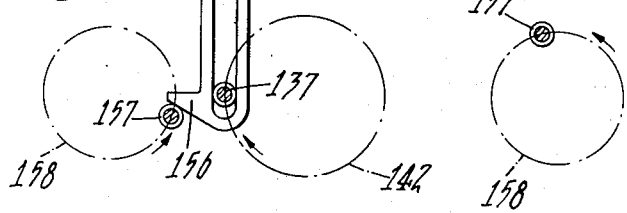
INVENTOR.
RONALD E. J. NORDQUIST
BY
ATTORNEYS

United States Patent Office 2,830,814
Patented Apr. 15, 1958

2,830,814

APPARATUS FOR FEEDING AND GAUGING ASKEW SHEETS

Ronald E. J. Nordquist, Summit, N. J., assignor to American Can Company, New York, N. Y., a corporation of New Jersey Application December 23, 1954, Serial No. 477,230

11 Claims. (Cl. 271—48)

The present invention relates to an apparatus for feeding and gauging sheet material required to be located in an accurate predetermined position for proper treatment and has particular reference to devices for feeding a sheet in an askew or oblique position against gauge elements to shift the sheet and register it relative to one or more of its edges.

The invention is particularly adapted to the registering or accurate positioning of sheets of material, preferably metallic sheets such as tin plate and the like for passage through sheet treating machines, such as lithographing machines, printing presses, slitters, scroll shears, and others for an operation upon the sheets. The invention is particularly adapted to the registering of sheets by the three point system, where the sheets are gauged by two gauging elements contacting the front edge and one gauging element contacting a side edge.

An object of the invention is the provision in an apparatus for feeding and gauging sheets of material, of devices which operate to register a sheet by feeding a leading corner of the sheet into engagement with gauge elements and pivoting the sheet on these elements into engagement with cooperating auxiliary gauge elements so as to accurately locate the sheet in a gentle manner which prevents nicking of the sheet edges and buckling of the sheet to insure proper registration of the sheet for a subsequent operation.

Numerous other objects and advantages of the invention will be apparent as it is better understood from the following description, which, taken in connection with the accompanying drawings, discloses a preferred embodiment thereof.

Referring to the drawings:

Figure 1 is a side elevation of a sheet feeding and gauging apparatus embodying the instant invention, parts being broken away;

Fig. 2 is a top plan view of the apparatus shown in Fig. 1;

Fig. 3 is an enlarged sectional view taken substantially along the broken line 3—3 in Fig. 2;

Fig. 4 is a top plan view of cam actuated parts shown in Fig. 3, the view illustrating the cyclic paths of travel of the different parts;

Fig. 5 is a fragmentary plan view of sheet feeding elements of the apparatus shown in Fig. 4, the view illustrating how the elements engage a corner of the sheet;

Fig. 6 is a sectional detail view taken substantially along the line 6—6 in Fig. 5;

Figs. 7 and 8 are sectional views taken substantially along the lines 7—7, 8—8 in Fig. 2; with parts broken away;

Figs. 9, 10 and 11 are enlarged fragmentary views similar to Fig. 7 and illustrating how a sheet is gauged;

Fig. 12 is a top plan view of a modified form of the invention, with parts broken away;

Fig. 13 is a sectional view taken substantially along the broken line 13—13 in Fig. 12, and Figs. 14 and 15 are schematic views taken substantially along the line 14—14 in Fig. 13 and illustrating different positions of the modified form sheet feeding elements.

As a preferred or exemplary embodiment of the invention the drawings illustrate principal parts of a sheet treating or lithographing machine of the character disclosed in United States Patent 2,529,513, issued November 14, 1950, to William Pechy. In such a machine flat substantially rectangular sheets A (Figs. 1 and 2) are fed in a substantially horizontal position along a path of travel for registering or aligning relative to their leading edge and a side edge and are then clamped in gauged position and carried into the bite of a pair of cooperating parallel contiguous cylinders comprising an upper or transfer cylinder 21 and a lower or impression cylinder 22, for performing an operation on the sheets as they pass between the cylinders.

The cylinders 21, 22 are rotated in unison and for this purpose are supported in a pair of spaced and parallel connected side frames 23 which constitute the main frame of the machine. The lower or impression cylinder 22 is mounted on a continuously rotated shaft 24, the ends of which are journaled in bearings 25 formed in the side frames 23. This shaft 24 is the main drive shaft of the machine and is rotated in any suitable manner.

The impression cylinder 22 preferably carries a pair of gripper fingers 28 (Figs. 2 and 8) for clamping the leading edge of a gauged sheet A to the outer surface of the cylinder to advance the sheet into position between the cylinders for passage therebetween by frictional contact with the cylinders. These gripper fingers 28 are disposed in a longitudinal recess 29 formed in the cylinder and are located in spaced relation so as to engage the leading edge of a sheet adjacent its side edges. The fingers are mounted on a rocker shaft 31 having its ends journaled in bearings 32 formed in the ends of the cylinder.

Each gripper finger 28 is formed with a front gauging face 34 (see also Figs. 9 and 10) which is substantially radial relative to the cylinder 22 and which projects out of the recess 29 adjacent the outer face of the cylinder. This gauging face 34 terminates in a flat clamping nose 35 which overlaps or overhangs the adjacent outer surface of the cylinder for clamping engagement against the leading edge of a sheet fed to the cylinder. One of these front gauging faces 34, at the upper right as viewed in Fig. 2 constitutes a primary front gauge while the outer face 34, lower right, constitutes an auxiliary front gauge.

The gripper fingers 28 are rocked toward and away from the outer surface of the cylinder 22 by cam action. For this purpose one end of the rocker shaft 31 extends beyond the impression cylinder 22 and carries a lever arm 37 (Figs. 2 and 7) having a cam roller 38 which operates against a stationary edge cam 39. The cam surrounds the main drive shaft 24 and is secured to the adjacent side frame 23. The cam 39 is formed with a high portion 41 which rocks the rocker shaft 31 to open and close the gripper fingers 28 and is also formed with a recess or relieved section 42 which permits the fingers to clamp the sheet. The cam roller 38 is maintained in engagement with the cam 39 by compression springs 44 (Fig. 8) which surround guide pins 45 having one end pivotally connected with arms 46 formed on the gripper fingers. The opposite end of each pin 45 loosely operates in a bore formed in a defining wall 47 of the recess 29 in the cylinder. The springs 44 are interposed between this wall 47 and the gripper arms 46.

Gauging of the side edge of a sheet A fed to the cylinder 22 preferably is effected by a primary side gauge or roller 51 (Figs. 2, 7, 9, 10, 11) which is mounted on the rocker shaft lever arm 37 so as to rotate with the impression cylinder 22. The roller is mounted on an axis substantially parallel with the front gauge faces 34 and is spaced back from the front gauge faces 34 a distance sufficient to permit side gauging of the sheet within a range of one half to one inch of its leading edge when this leading edge is in contact with the front gauges. The side gauge roller 51 extends for a distance above and below the gripper finger noses 35 to insure engagement with the sheet edge.

Feeding of a sheet A to the cylinders 21, 22 preferably is effected by a pair of continuously operating spaced and parallel endless chain conveyors 54 (Figs. 1 and 2), having feed dogs 55 attached thereto at spaced intervals along their length. These conveyors 54 operate over sprockets 56 mounted on a sprocket shaft 57 journaled in bearings formed in the machine frame. The shaft 57 is rotated by an endless chain 58 which operates over a sprocket on the shaft and over a drive sprocket 59 on the main drive shaft 24. The sheets A during their travel with the conveyors 54 are supported on a plurality of longitudinal spaced and parallel support rails 61 secured to transverse rails 62 having their ends attached to the side frames 23.

The sheets A being fed to the cylinders 21, 22 by the conveyors 54 are located in an askew position with one front or leading corner of the sheets in advance of the oppositely disposed front corner as best shown in Fig. 2. The leading corner is the corner adjacent the side edge to be gauged, i. e. the side on which the side gauge element or roller 51 is disposed. In order to thus feed the sheets in this askew relation the feed dogs 55, on the conveyor 54 on the side gauge side of the machine are located slightly in advance of the feed dogs on the opposite cooperating conveyor 54 as shown in Fig. 2.

As a sheet A, in the askew position, is fed toward the cylinders 21, 22 by the conveyors 54, it is engaged by an auxiliary feeding device 65 (Figs. 1, 2 and 3) which takes the sheet away from the conveyor feed dogs 55 and displaces or diverts the sheet in an angular direction toward the side gauging element 51 for the purpose of first engaging the leading corner of the sheet with the side gauge element 51 and the adjacently disposed primary front gauge element 34 and then pivoting the sheet on this engaged corner to align the leading edge of the sheet with the auxiliary front gauge 34 to fully register the sheet. This gauging operation is effected just before the gripper fingers 28 clamp the leading edge of the sheet against the outer surface of the impression cylinder as hereinbefore explained.

The displacement of the moving sheet A into fully gauged position preferably is effected by engagement of the sheet edges adjacent the trailing corner which is diagonally opposite the leading corner of the sheet. For this purpose the auxiliary feeding device 65 is located adjacent the path of travel of the side edge opposite the gauging side edge of the sheet as shown in Fig. 2.

The auxiliary feeding device 65 preferably comprises a movable horizontal feeding head 67 (Figs. 1, 2, 3, 4 and 5) which carries a pair of yieldably mounted feed blocks 68, 69 located at right angles to each other for engagement with the rear and side edges of the trailing corner of the sheet. These feed blocks 68, 69 preferably have straight feeding faces 70 (Fig. 4) provided with outwardly projecting lugs 71 (see also Fig. 6) disposed above the feed line of the sheet for overhanging the sheet to prevent vertical displacement thereof.

The feed blocks 68, 69 are free to oscillate within a predetermined range to self-align with the sheet edges. For this purpose the blocks are mounted on pivot pins 72 carried in the outer bifurcated ends of a pair of scissor shaped levers 73 freely mounted for oscillation on the upper end of a vertical head shaft 74 which is freely carried in bearings in the head 67. Each lever 73 is backed up by a pressure button 75 which engages against a shoulder 76 on the lever and which is disposed in a bore 77 (Fig. 4) disposed in the head 67. Each bore 77 contains a compression spring 78 which urges the button toward the lever. Outward travel of the lever under pressure of the spring 78 is limited by a stop lug 79 formed on the lever and engageable against a web 81 formed on the head 67.

The head 67 carrying the feed blocks 68, 69 is controlled by cam action to move through an orbit adjacent the path of travel of the sheet to position the head adjacent the trailing corner of the sheet and advance with the sheet while shifting it into gauged position. For this purpose, the head 67 carries a cam roll 83 (Figs. 3 and 4) which operates in a cam groove 84 of a stationary inverted face cam 85 disposed horizontally at a level above the path of travel of the sheets. The cam 85 surrounds a substantially vertical shaft 86 and is held stationary by attachment to a bracket 87 secured to the adjacent side frame 23.

The vertical shaft 74 which carries the head 67 is cam controlled by a cam roller 89 which is mounted on the lower end of the head shaft 74. This cam roller 89 operates in a cam groove 91 of a horizontal stationary face cam 92 located at a level below the path of travel of the sheets. The cam surrounds the crank shaft 86 and is secured to the bracket 87. The head shaft 74 is secured to and is carried by one end of a short horizontal link 94. (See Fig. 3.) The opposite end of the link 94 is mounted on a pivot pin 95 carried in the outer end of a long arm 96 of a bell crank lever 97 mounted on a pivot pin 98 in a crank 99 attached to the crank shaft 86. A short arm 101 of the bell crank lever 97 carries a cam roller 102 which operates in a second or auxiliary cam groove 103 in the lower face cam 92.

The crank shaft 86 at its upper end is journaled in a ball bearing 105 located in the upper cam 85 and at its lower end in a ball bearing 106 in the bracket 87. This crank shaft 86 is continuously rotated in time with the conveyors 54 by a bevel gear 108 which is secured to the lower end of the shaft. The gear 108 meshes with and is driven by a bevel gear 109 mounted on a horizontal shaft 111 journaled in bearings 112 formed in the bracket 87. The shaft 111 is driven by a helical gear 114 carried on the shaft and meshing with a helical gear 115 on the conveyor sprocket shaft 57.

Hence as the crank-shaft 86 is rotated in time with the conveyors 54, one revolution of the crank-shaft 86 for each sheet A, the crank 99 rotates through a circular path of travel 116 (Fig. 4) carrying the bell crank lever 97 with it and causing the cam roller 102 on the short arm 101 of the lever to follow the auxiliary cam groove 103 of the cam 92. The outer end of the long arm 96 of the lever 97 thus controlled by the cam 92 pulls the link 94 and the head 67 mounted thereon, along a path of travel around the crank shaft 86 but controlled by the cam groove 91 in the lower cam 92 and the cam groove 84 in the upper cam 85.

The horizontal motion imparted to the head 67 through these cams 85, 92 is such as to advance the feed blocks 68, 69 into engagement with the rear and side edges of the trailing corner of the askew sheet A as shown in Figs. 2, 4 and 5 causing the feed blocks to align themselves with the sheet edges. As the head 67 continues to move, the feed blocks 68, 69 yieldably (through the springs 78) accelerate the sheet to advance it ahead of the conveyor feed dogs 55 and simultaneously push the sheet diagonally as shown in the dot and dash lines at S in Fig. 4, to engage the opposite leading corner of the sheet with the primary front gauge 34 and side gauge 51 as shown in the dot and dash line position T in Fig. 2 and in full lines in Fig. 10. Acceleration of the sheet is effected by the auxiliary cam groove 103 in the lower face cam 92.

As the head 67 advances still further the feed blocks 68, 69 pivot the sheet on its leading corner engaged against the primary front gauge 34 and side gauge 51 and thus shift the remote portion of the leading edge of the sheet into engagement with the auxiliary front gauge 34 see Fig. 2 and dot and dash lines at U, Fig. 4, to fully register the sheet against the three side and front gauge points 51 and 34. A slight buckling of the sheet in a diagonal direction takes place during this gauging operation, but this is as intended to insure that the leading edge and gauged side edge are firmly in contact with the gauge faces. However no buckling takes place along the leading edge of the sheet to cause inaccurate gauging.

The feed blocks 68, 69 advance with the sheet and hold it in this gauged position until the gripper fingers 28 close down on the gauged leading edge and clamp it tightly against the impression cylinder 22 for passage between the cylinders as shown in Figs. 7 and 11. As soon as the gripper fingers 28 clamp the sheet in gauged position, the head 67, through its controlling cams 85, 92 falls back to take the feed blocks 68, 69 away from the gauged sheet and to follow through the remainder of its path of travel to return for a repeat cycle of operation on the next sheet A being advanced by the conveyor dogs 55. This completes the cycle of operation of the machine.

A modified form of the invention is shown in Figs. 12, 13, 14 and 15 in which the askew sheets A are shifted into gauged position against the primary front and side gauges 34, 51 and the auxiliary front gauge 34, by a magnetic auxiliary feeding device disposed at an angle to the path of travel of the sheets to push the leading corner of the sheets diagonally toward the primary gauges 34, 51. This device is located directly beneath the path of travel of the sheets A adjacent the terminal end of the conveyors 54 and comprises in part, one or more flat top permanent magnets 125 which are movable into contact with the lower surface of the sheets to yieldably grip them and shift them diagonally toward the gauge points as explained in connection with the preferred form of the invention. The top surfaces of the magnets are smooth so as to facilitate sliding of the sheets on the magnets when the sheets are pivoted on their leading corners when engaged with the primary gauge points.

The magnet or magnets 125 preferably are carried on the upper end of an upright bar 126 which adjacent the magnet carries a cam roller 127. The cam roller 127 operates in a cam groove 128 in a stationary face cam 129 secured to a bracket 131 which extends up from a time member 132 of the side frame 23. The cam groove 128 includes a straight section 134 which is substantially horizontal and parallel with the sheet support bars 61 for guiding the magnet parallel with the travel of the sheets A, and a connecting and depending substantially circular section 135 to guide the magnet up into engagement with the sheets and to withdraw the magnet from the sheets during a sheet gauging operation.

The cam roller 127 is propelled along the cam groove 128 by a pair of actuating rollers 137 which operate in a slot 138 formed in the upright bar 126 for nearly its full length. The actuating rollers 137 are carried on a pair of vertically spaced spur gears 141, 142 serving as cranks for the rollers 137. The gears 141, 142 are mounted on shafts 143, 144 journaled in bearings formed in the bracket 131. The gears 141, 142 are rotated in unison, in the same direction, and at the same speed, by an idler gear 146 carried on a stub shaft 147 in the bracket 131, to retain the bar 126 in an upright position.

The gears 141, 142, 146 are rotated through the gear shaft 143. For this purpose the shaft 143 is connected by a universal joint 149 to a short shaft 151 which is journaled in the adjacent side frame 23. The shaft 151 carries a gear 152 which meshes with an idler gear 153 which in turn meshes with and is driven by a gear 154 on the conveyor shaft 57 to actuate the magnet 125 in time with the advancement of the askew sheets A by the conveyors 54.

Hence as the actuating rollers 137 are moved through circular paths of travel by rotation of their gears 141, 142 through the gear train described above, they propel the upright bar 126 through an orbit controlled by the cam groove 128 and cause the cam roller 127 on the bar to traverse the cam groove. During this travel of the cam roller it moves the bar upwardly to bring the magnet 125 into engagement with the bottom face of a sheet A being fed by the conveyors 54 and then moves the magnet horizontally in a plane adjacent and parallel with the path of travel of the sheet as the cam roller traverses the parallel section 134 of the cam groove, to shift the sheet into gauging position with the side gauge 51, and primary and auxiliary front gauges 34 in the same manner as explained hereinbefore in connection with the preferred form of the invention.

After the leading edge of the sheet is clamped by the gripper fingers 28, the magnet 125 moves down away from the sheet by passage of the cam roller 127 from the parallel section 134 into the circular section 135 of the cam groove 128 for return of the magnet for a repeat feeding operation upon the next sheet fed by the conveyors. The parallel section 134 of the cam groove 128 maintains the top face of the magnet in a substantially horizontal position parallel with the path of travel of the sheets from the time the magnet is moved up into engagement with the sheet to the time it leaves the sheet to facilitate feeding of the sheet and sliding it on the smooth face of the magnet when it pivots into the gauged position.

In order to facilitate upward movement of the magnet into engagement with the sheet and to provide for proper entrance of the cam roller 127 into the parallel or horizontal section 134 of the cam groove 128, the bottom end of the upright bar 126 is provided with a tapered outwardly projecting lug 156 which is engaged by and temporarily lifted by a lifter roller 157 which rotates into and out of the path of travel of the lug. The lifter roller 157 is carried on a gear 158 which meshes with the gear 142 and rotates in the opposite direction. The gear 158 is mounted on a shaft journaled in a bearing in the bracket 131.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a feeding and gauging mechanism for a sheet treating machine, the combination of primary feeding means for feeding a sheet forward in an askew position with one front corner in advance of the other, cooperating gauges disposed in the path of the leading end of said sheet and comprising a side gauge for engaging the side of said sheet close to the leading corner of the sheet and front gauges for gauging the front edge of said sheet, means for moving said cooperating side and front gauges in a forward direction in time with said primary feeding means, auxiliary feeding means operable in time with said primary feeding means for advancing said askew sheet away from said primary feeding means and in a diagonal direction toward said cooperating gauges for engaging its leading corner against said side gauge and an adjacent front gauge and for pivoting said askew sheet thereon to bring the front edge of the sheet into alignment with said front gauges as said side and front gauges move forward.

2. In a feeding and gauging mechanism for a sheet treating machine, the combination of primary feeding means for feeding a sheet in a forward direction in an askew position with one front corner in advance of the other, a pair of cooperating gauges disposed in angular relation and in the path of the leading end of said sheet, said gauges comprising a side gauge and a primary front gauge for gauging a corner of said sheet, an auxiliary front gauge disposed in laterally spaced relation to said primary front gauge, means for advancing said side and front gauges in a forward direction in time with said feeding means, and auxiliary feeding means operable in time with said primary feeding means and engageable with the rear and side edges of the trailing rear corner diagonally opposite the leading corner of said sheet for moving said sheet in a diagonal direction away from said primary feeding means and toward said cooperating side gauge and primary front gauge for engaging the leading corner of said sheet against said cooperating gauges and for pivoting said sheet on said cooperating gauges to bring the front edge of the sheet into engagement against said auxiliary front gauge to align said sheet with said side gauge and said primary and auxiliary front gauges.

3. In a feeding and gauging mechanism of the character defined in claim 2 wherein said feeding means is a pair of yieldable feed blocks disposed in angular relation to each other for engaging adjacent edges of the trailing corner of said sheet, and wherein actuating means are provided for moving said blocks longitudinally and transversely of the path of travel of said sheet for shifting and pivoting said sheet toward said gauges.

4. In a feeding and gauging mechanism of the character defined in claim 2 wherein said feeding means is a feeding head having a pair of feed blocks pivotally and yieldably mounted thereon for self-aligning engagement against adjacent edges of the trailing corner of said sheet, and wherein actuating means are provided for moving said head.

5. In a feeding and gauging mechanism of the character defined in claim 4 wherein said head is actuated and supported on a series of cam controlled elements connected to and actuated by a rotatable crank to move said head along a controlled predetermined path of travel and wherein means are provided for rotating said crank.

6. In a feeding and gauging mechanism of the character defined in claim 2 wherein there is provided means movable with said front gauges for gripping the gauged leading marginal edge portion of the sheet for advancing said sheet in its gauged relation for a subsequent treatment.

7. In a feeding and gauging mechanism of the character defined in claim 2 wherein there is provided a rotating cylinder for receiving and advancing a gauged sheet for a subsequent treatment and wherein said gauges move with said cylinder.

8. In a feeding and gauging mechanism of the character defined in claim 2 wherein said primary feeding means is a pair of spaced and parallel conveyors carrying feed dogs, the feed dogs on one of said conveyors being disposed transversely in advance of the corresponding feed dogs on the other of said conveyors for advancing substantially rectangular sheets along a predetermined path of travel in an askew relation with one leading corner in advance of the other.

9. In a feeding and gauging mechanism of the character defined in claim 2 wherein said auxiliary feeding means is a magnetic means for engagement with a flat surface of said sheet for shifting and pivoting said sheet into position against said gauges.

10. In a feeding and gauging mechanism of the character defined in claim 9 wherein said magnetic means is formed with a flat smooth sheet attracting surface, said surface being movable in a plane adjacent and parallel with the path of travel of said sheet for engaging and shifting said sheet and wherein actuating means are provided for said magnetic means.

11. In a feeding and gauging mechanism of the character defined in claim 9 wherein said magnetc means are actuated and supported on a cam controlled element connected to and actuted by at least one rotatable crank to move said magnetic means along a controlled predetermined path of travel and wherein means are provided for rotating said crank.

References Cited in the file of this patent

UNITED STATES PATENTS

| | | |
|---|---|---|
| 434,630 | Hart | Aug. 19, 1890 |
| 1,014,269 | Tichborne | Jan. 9, 1912 |
| 2,685,446 | Backhouse | Aug. 3, 1954 |

FOREIGN PATENTS

| | | |
|---|---|---|
| 546,427 | Germany | Feb. 25, 1932 |